(12) United States Patent
Chang et al.

(10) Patent No.: US 9,378,554 B2
(45) Date of Patent: Jun. 28, 2016

(54) REAL-TIME RANGE MAP GENERATION

(71) Applicant: CATERPILLAR INC., Peoria, IL (US)

(72) Inventors: Hong Chang, Peoria, IL (US); Paul Russell Friend, Morton, IL (US)

(73) Assignee: Caterpillar Inc., Peoria, IL (US)

(*) Notice: Subject to any disclaimer, the term of this patent is extended or adjusted under 35 U.S.C. 154(b) by 0 days.

(21) Appl. No.: 14/510,869

(22) Filed: Oct. 9, 2014

(65) Prior Publication Data

US 2016/0104289 A1  Apr. 14, 2016

(51) Int. Cl.
| G06K 9/32 | (2006.01) |
| G06T 7/00 | (2006.01) |
| G01S 17/89 | (2006.01) |
| H04N 13/02 | (2006.01) |
| G05D 1/02 | (2006.01) |
| G06T 7/20 | (2006.01) |

(52) U.S. Cl.
CPC ............... G06T 7/0034 (2013.01); G01S 17/89 (2013.01); G05D 1/0251 (2013.01); G06T 7/2033 (2013.01); H04N 13/0207 (2013.01); G06T 2200/04 (2013.01); G06T 2207/10028 (2013.01); G06T 2207/30252 (2013.01)

(58) Field of Classification Search
CPC ........... G06T 7/0034; G06T 7/2033; G06T 2207/30252; G06T 2200/04; G06T 2207/10028; G01S 17/89; G05D 1/0251; H04N 13/0207
USPC ......... 382/118, 117, 199, 209, 217, 276, 285, 382/294, 312, 243, 154; 396/159, 52, 55, 396/281, 287, 290, 103, 89; 250/559.29, 250/559.3, 200, 216, 229, 231.1, 231.13, 250/231.14, 231.16
See application file for complete search history.

(56) References Cited

U.S. PATENT DOCUMENTS

| 7,003,136 B1* | 2/2006 | Harville | G06K 9/00201 348/169 |
| 7,616,817 B2* | 11/2009 | Hilde | G01S 7/4802 382/106 |
| 7,970,178 B2 | 6/2011 | Song | |
| 8,090,194 B2* | 1/2012 | Golrdon | G01B 11/2513 382/154 |
| 8,238,612 B2 | 8/2012 | Susca et al. | |
| 8,385,595 B2 | 2/2013 | Liu et al. | |
| 8,970,680 B2* | 3/2015 | Wang | G06T 7/0069 348/42 |

(Continued)

FOREIGN PATENT DOCUMENTS

| EP | 0243493 A1 | 11/1987 |
| WO | WO 8702484 A1 | 4/1987 |

(Continued)

*Primary Examiner* — Sheela C Chawan
(74) *Attorney, Agent, or Firm* — Finnegan, Henderson, Farabow, Garrett & Dunner, LLP (57) ABSTRACT

A system, method, and non-transitory computer-readable storage medium for range map generation is disclosed. The method may include receiving an image from a camera and receiving a 3D point cloud from a range detection unit. The method may further include transforming the 3D point cloud from range detection unit coordinates to camera coordinates. The method may further include projecting the transformed 3D point cloud into a 2D camera image space corresponding to the camera resolution to yield projected 2D points. The method may further include filtering the projected 2D points based on a range threshold. The method may further include generating a range map based on the filtered 2D points and the image.

20 Claims, 5 Drawing Sheets

(2 of 5 Drawing Sheet(s) Filed in Color)

(56) References Cited

U.S. PATENT DOCUMENTS

| | | | |
|---|---|---|---|
| 2006/0220912 A1 | 10/2006 | Heenan et al. | |
| 2012/0256923 A1* | 10/2012 | Gautron | G06T 15/50 345/426 |
| 2014/0204215 A1* | 7/2014 | Kriel | H04N 7/181 348/159 |
| 2014/0300732 A1* | 10/2014 | Friend | G06T 7/0042 348/135 |
| 2015/0109415 A1* | 4/2015 | Son | G01B 11/22 348/46 |
| 2015/0110350 A1* | 4/2015 | Mian | G08G 1/162 382/103 |

FOREIGN PATENT DOCUMENTS

| WO | WO 2007/051972 A1 | 5/2007 |
|---|---|---|
| WO | WO 2011/146259 A2 | 11/2011 |

* cited by examiner

REAL-TIME RANGE MAP GENERATION

TECHNICAL FIELD

The present disclosure relates generally to visual odometry techniques and more particularly, to visual odometry systems and methods having real-time range map generation.

BACKGROUND

Machines such as, for example, dozers, motor graders, wheel loaders, wheel tractor scrapers, and other types of heavy equipment are used to perform a variety of tasks at a worksite. Autonomously and semi-autonomously controlled machines are capable of operating with little or no human input by relying on information received from various machine systems. For example, based on machine movement input, terrain input, and/or machine operational input, a machine can be controlled to remotely and/or automatically complete a programmed task. By receiving appropriate feedback from each of the different machine systems during performance of the task, continuous adjustments to machine operation can be made that help to ensure precision and safety in completion of the task. In order to do so, however, the information provided by the different machine systems should be accurate and reliable. Parameters indicative of machine motion, e.g., velocity and change in position of the machine, are parameters whose accuracy may be important for control of the machine and its operation.

Some exemplary systems determine velocity and change in position based on vision systems, utilizing methods known as visual odometry. For example, an exemplary system that may be used to determine changes in position is disclosed in U.S. Pat. No. 8,238,612 to Krishnaswamy et al. that issued on Aug. 7, 2012 (the '612 patent). The system in the '612 patent utilizes two optical cameras (stereo image) to obtain images at two different times. Based on changes between the images from the two cameras at different times, the system determines the translational and rotational movement of a mobile machine on which the cameras are mounted. In another embodiment, the system in the '612 patent utilizes a Light Detection and Ranging (LIDAR) device to obtain a 3D image of a scene at two different times. Based on changes between the LIDAR-based images, the system determines the translational and rotational movement of a mobile machine on which the LIDAR device is mounted.

Although the system of the '612 patent may be useful for determining various motions of a mobile machine, in some situations, a system which utilizes a single camera is desirable. For example, in the interest of saving initial costs and maintenance costs, a machine may be outfitted with only a single camera. A single camera does not provide the stereo image that is required by the system of the '612 patent. Furthermore, the LIDAR-based system of the '612 patent is not suitable for uniform terrain. Moreover, the '612 patent may not be able to fuse the LIDAR data with a single camera image data to create a range map that has both information on features in a given environment and related range information for those features.

The disclosed range map generation system is directed to overcoming one or more of the problems set forth above and/or other problems of the prior art.

SUMMARY

In one aspect, the present disclosure is directed to a range map generation system. The system may include a range detection unit, a camera, and a controller. The controller may be configured to execute instructions to perform operations including receiving an image from the camera, receiving a 3D point cloud from the range detection unit, and transforming the 3D point cloud from range detection unit coordinates to camera coordinates. The operations may further include projecting the transformed 3D point cloud into a 2D camera image space corresponding to the camera resolution to yield projected 2D points. The operations may further include filtering the projected 2D points based on a range threshold. The operations may further include generating a range map based on the filtered 2D points and the image.

In another aspect, the present disclosure is directed to a computer-implemented method for range map generation. The method may include receiving an image from a camera and receiving a 3D point cloud from a range detection unit. The method may further include transforming the 3D point cloud from range detection unit coordinates to camera coordinates. The method may further include projecting the transformed 3D point cloud into a 2D camera image space corresponding to the camera resolution to yield projected 2D points. The method may further include filtering the projected 2D points based on a range threshold. The method may further include generating a range map based on the filtered 2D points and the image.

In yet another aspect, the present disclosure is directed to a non-transitory computer-readable storage medium storing instructions that enable a computer to implement a method for range map generation. The method may include receiving an image from a camera and receiving a 3D point cloud from a range detection unit. The method may further include transforming the 3D point cloud from range detection unit coordinates to camera coordinates. The method may further include projecting the transformed 3D point cloud into a 2D camera image space corresponding to the camera resolution to yield projected 2D points. The method may further include filtering the projected 2D points based on a range threshold. The method may further include generating a range map based on the filtered 2D points and the image.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
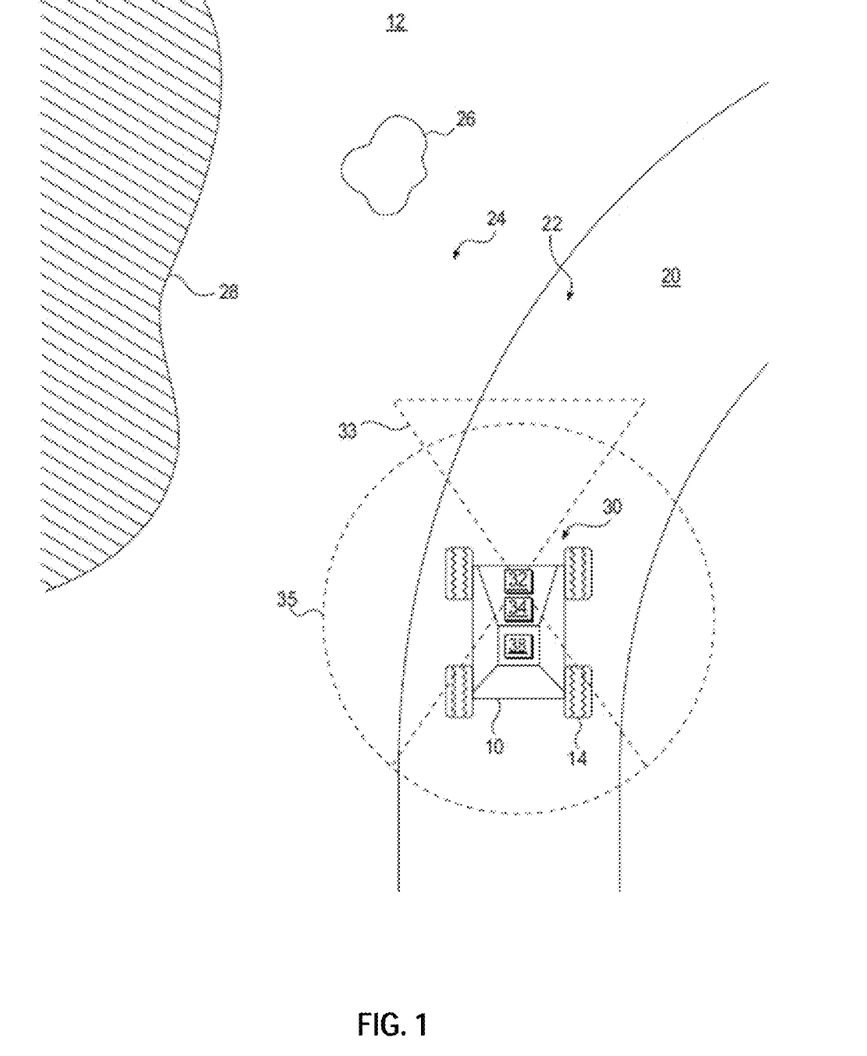
FIG. 1 is a pictorial illustration of an exemplary disclosed work machine on a worksite having an exemplary range map generation system.

FIG. 1 illustrates an exemplary machine 10. Machine 10 may be a mobile machine that performs one or more operations associated with an industry, such as mining, construction, farming, transportation, or any other industry, at a worksite 12. For example, machine 10 may be a load-moving machine, such as a haul truck, a loader, an excavator, or a scraper. Machine 10 may be manually controlled, semi-autonomously controlled, or fully-autonomously controlled.

Machine 10 may generally include a power source (not shown), at least one traction device 14, and a range map generation system 30 for determining a range map of machine 10's environment. The power source may be connected to traction device 14, e.g., by a drivetrain, thereby driving traction device 14 to propel machine 10 within worksite 12. Traction device 14 may include wheels located on each side of machine 10. Alternatively, traction device 14 may include tracks, belts, or other known traction devices.

Worksite 12 may be a mine site or any other type of worksite traversable by machine 10. In some embodiments, worksite 12 may include various features. Features may be any characteristic, quality, and/or object of worksite 12. Exemplary features of worksite 12 may be a road 20, a dirt-covered portion 22 of the ground, a gravel-covered portion 24 of the ground, rocks 26, sidewalls 28 of worksite 12, and any other objects such as work signs, poles, dirt mounds, trees, and/or other machines, etc. or portions of such. Features may have various colors and/or shapes. In some situations, the ground of worksite 12 may be relatively flat. In other situations, the ground of worksite 12 may include variations in the contour of the ground and/or objects that protrude from the surface of the ground, such as rocks 26 or any other objects.

Figure 2:
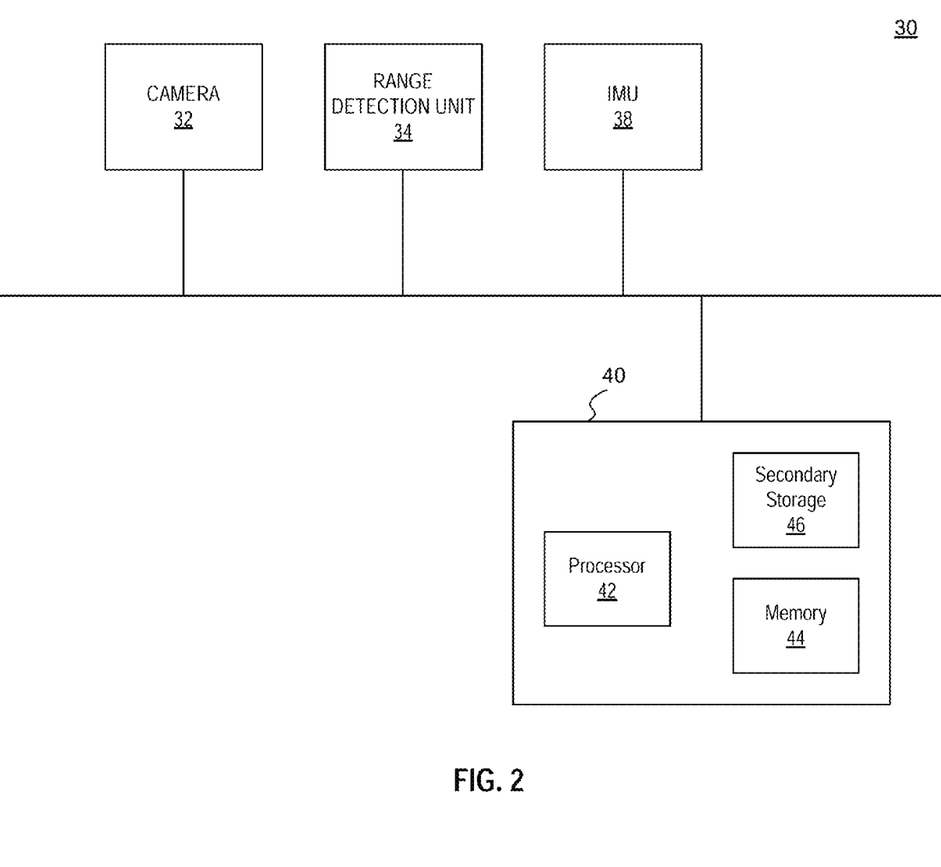
FIG. 2 is a diagrammatic illustration of the exemplary range map generation system of FIG. 1.

FIG. 2, in conjunction with FIG. 1, further describes an exemplary embodiment of range map generation system 30. The range map generation system 30 may include a camera 32, a LIDAR unit 34, an inertial measurement unit (IMU) 38, and controller 40. The above sensors and controller 40 may be connected to each other via a bus. In other embodiments, any suitable architecture may be used, including any combination of wired and/or wireless networks. Additionally, such networks may be integrated into any local area network, wide area network, and/or the Internet.

Camera 32 may be affixed to machine 10, for example, by being mounted to a body frame of machine 10. Camera 32 may take optical images of worksite 12 at successive time points. In some embodiments, camera 32 has a field of view 33 that determines the content of the images. Field of view 33 may be based on the view-angle of a lens of camera 32 and the orientation of camera 32 as mounted on machine 10. As machine 10 moves about worksite 12, the portion of worksite 12 within field of view 33 that is captured as a camera image changes.

Range detection unit 34 (e.g., LIDAR unit 34 in the embodiments described herein) may obtain depth information for objects in its field of view and such depth information may be referred to as range data. In other embodiments, range map generation system stem 30 may include other range detection units to provide range information, such as other perception sensors (e.g., a sonar device and/or radar device). LIDAR unit 34 may include a plurality of light sources, such as lasers. Each laser may generate a laser beam which is directed at various points of worksite 12. LIDAR unit 34 may further include one or more detector devices that receive the laser beams after reflection off of various points of worksite 12. Based on the time between generating the laser beam and receiving the reflected laser beam (referred to as time-of-flight measurements), range map generation system 30 may determine a distance to the corresponding point. In such a manner, range map generation system 30 may generate a 3D point cloud image representative of a part of worksite 12 that is detected by LIDAR unit 34. Each data point in this LIDAR image may include a distance from the LIDAR unit 34 to a detected point of worksite 12. This LIDAR image is in contrast with an optical camera image, in which each data point generally represents a color of the detected point. In an exemplary embodiment, LIDAR unit 34 may include 64 lasers, which may collectively obtain approximately one million points per LIDAR image. In other embodiments, LIDAR unit 34 may include more or less than 64 lasers and/or obtain more or less points per LIDAR image. In some embodiments, LIDAR unit 34 may generate a point cloud image that captures a full 360 degrees surrounding of machine 10. In other embodiments, LIDAR unit 34 may capture 270 degrees of the surroundings of machine 10 (as shown in FIG. 1, as field of view 35), or any other amount of the surroundings.

IMU 38 may include one or more devices that provide measurements of angular position, rates, and/or acceleration. For example, IMU 38 may include a 6-degree of freedom IMU, which includes a 3-axis accelerometer, a 3-axis angular rate gyroscope, and/or a 2-axis inclinometer. The 3-axis accelerometer may provide signals indicative of the acceleration of machine 10 in an x-, y-, and z-axis direction. The 3-axis angular rate gyroscope may provide signals indicative of the pitch rate, yaw rate, and roll rate of machine 10. The 2-axis inclinometer may provide the pitch angle and the roll angle, for example. Measurements from IMU 38 may include a bias offset or a bias drift. Bias offset is a constant error offset component in the measurement. Bias drift is a dynamic error offset component in the measurement. In addition, data that is generated from integrating measurements from IMU 38 may include a random walk error due to noise. That is, each measurement may include some error due to noise, which is then compounded by the integration of measurements. Such error may be unbounded. In various embodiments, the bias offset, bias drift, and/or noise model of IMU 38 may be known, either by conducting device characterization measurements or by referring to the device specifications data.

Controller 40 may include a processor 42, a memory 44, and a secondary storage 46, and any other components for running an application. Processor 41 may include one or more known processing devices, such as a microprocessor. Memory 42 may include one or more storage devices configured to store information used by controller 40 to perform certain functions related to disclosed embodiments. Secondary storage 43 may store programs and/or other information, such as information related to processing data received from one or more components of range map generation system 30, as discussed in greater detail below. When processor 41 executes programs stored in secondary storage 43 and loaded into memory 42, controller 40 may process signals received from camera 32, LIDAR 34, and/or IMU 38 and generate a range map of the environment surrounding machine 10.

For example, LIDAR unit 34 may generate a first range image corresponding to a first image of camera 32 at one moment in time, and a second range image corresponding to a second image of camera 32 at a successive moment in time. Range map generation system 30 may combine the corresponding images from camera 32 and LIDAR unit 34 to generate two range maps. A range map may be an image where a data point identifies a feature captured by the camera image and a range associated with that feature. The range may represent a distance, from camera 32, of that feature of worksite 12. Exemplary methods for range map generation are described in the next section with reference to FIGS. 3 and 4.

The range maps may be utilized by controller 40 to determine, for example, motion of machine 10. In one example, camera 32 may capture an image of a scene within field of view 33. At a successive moment in time, camera 32 may capture a new image in field of view 33 after machine 10 has moved forward a certain distance in that time. Controller 40 may identify features of worksite 12 captured in the two images that are common to both. For example, controller 40 may identify the boundary edge between dirt-covered portion 22 and gravel-covered portion 24 based on the different colors of the pixels in the captured images. Controller 40 may utilize this boundary edge as a feature, which shifts in position in a first image and a second image. Using data from LIDAR unit 34, controller 40 may generate two range maps and each range map may provide a range for the boundary edge feature. Based on the shift and the time elapsed during the shift between the two range maps, controller 40 may estimate various rates of motion (e.g., linear velocities in the x-, y-, and z-axis directions, and angular velocities in the yaw, roll, and pitch directions) of machine 10. Techniques for estimating motion of a machine based on camera images and associated range information are known in the art.

Figure 3:
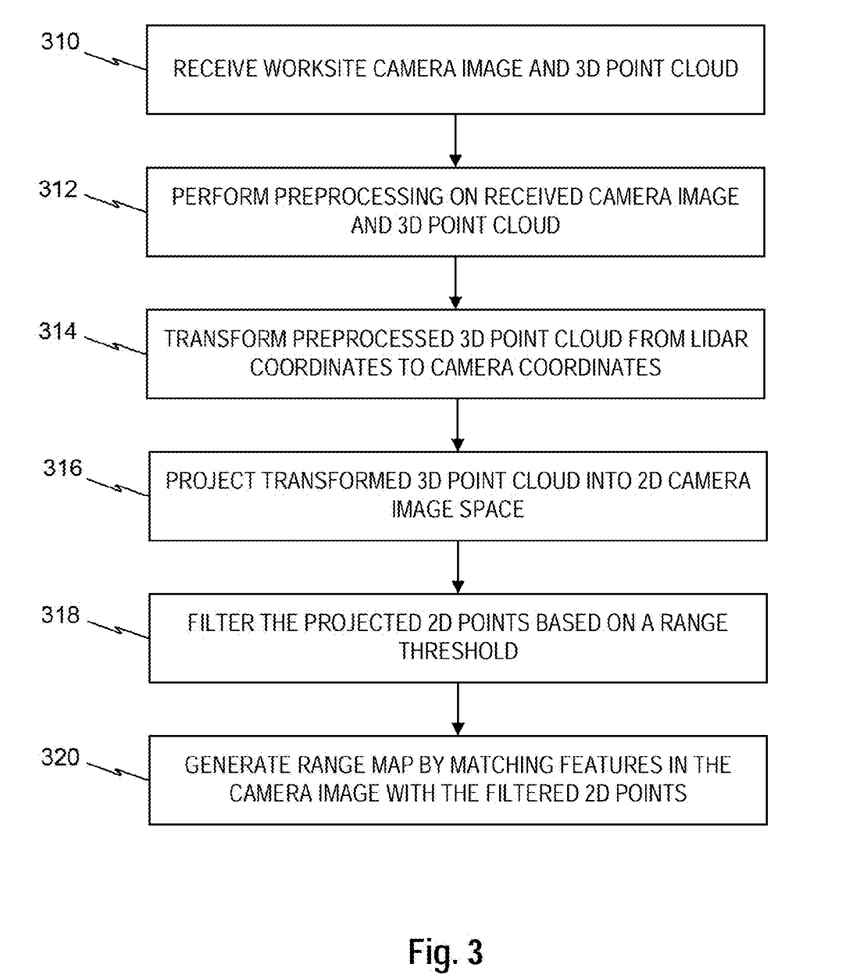
FIG. 3 is a flowchart depicting an exemplary disclosed method that may be performed by the range map generation system of FIG. 2.

FIG. 3 provides an exemplary illustration of range map generation according to various disclosed embodiments. FIG. 3 is discussed in the following section.

INDUSTRIAL APPLICABILITY

The disclosed range map generation system 30 may be applicable to any machine, such as machine 10, for which range map generation is desired. As discussed earlier, range map generation may be desirable for real-time visual odometry applications with limited processing power where motion estimation is desired. Range map generation may also be desirable for any mine site applications that require projecting 3D Lidar point clouds into image space, such as 3D reconstruction of mine/construction site or terrain mapping for visualization of the mine site. The disclosed range map generation system 30 may provide for these needs through the use of methods described herein, which may be performed by controller 40, for example. Operation of range map generation system 30 will now be explained with respect the FIGS. 3-5.

FIG. 3 depicts a flowchart showing an exemplary method for range map generation. In step 310, controller 40 may receive an image of worksite 12 from camera 32 and a 3D point cloud captured by LIDAR unit 34. In step 312, controller 40 may perform preprocessing on the received camera image and the 3D point cloud. For example, as part of step 312, controller 40 may crop and/or mask the camera image to eliminate machine parts and sky captured in the camera image. Machine or vehicle parts may be removed from the camera image because they appear the same in consecutive images as the camera is installed in a fixed portion and hence, any motion estimation calculation based on the machine or vehicle parts would result in a "no motion" conclusion which is not true and could introduce errors. Similarly, sky or clouds are not reliable features for motion estimation and may cause invalid feature matching.

Figure 4:
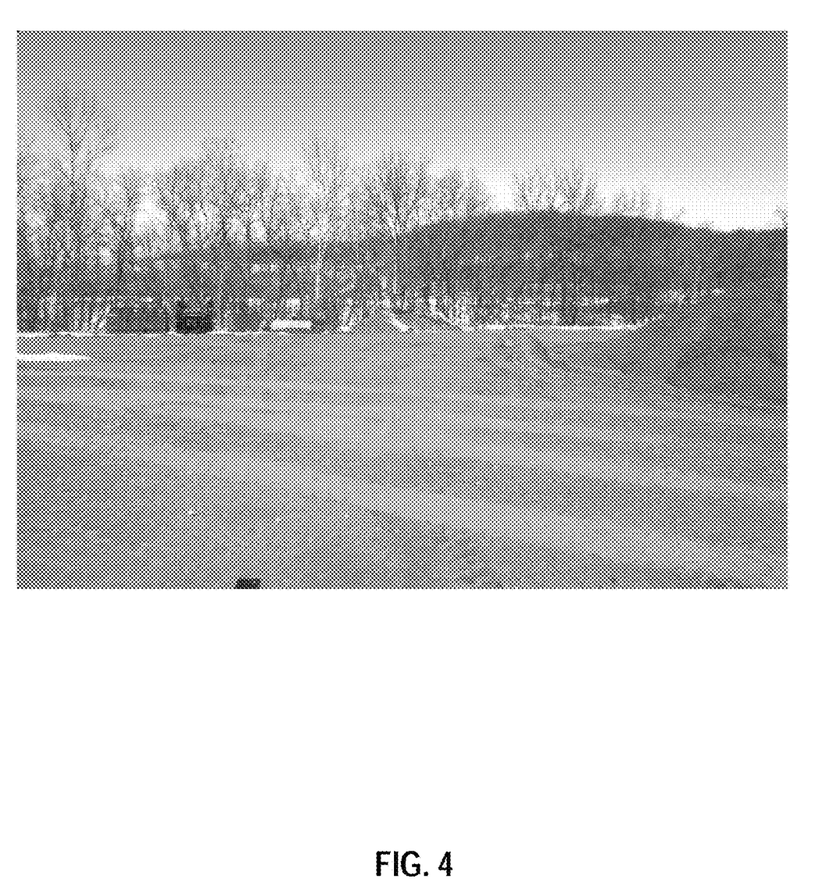
FIGS. 4 and 5 illustrate an exemplary camera image, and a 3D point cloud overlaid on the camera image, respectively.
Figure 5:
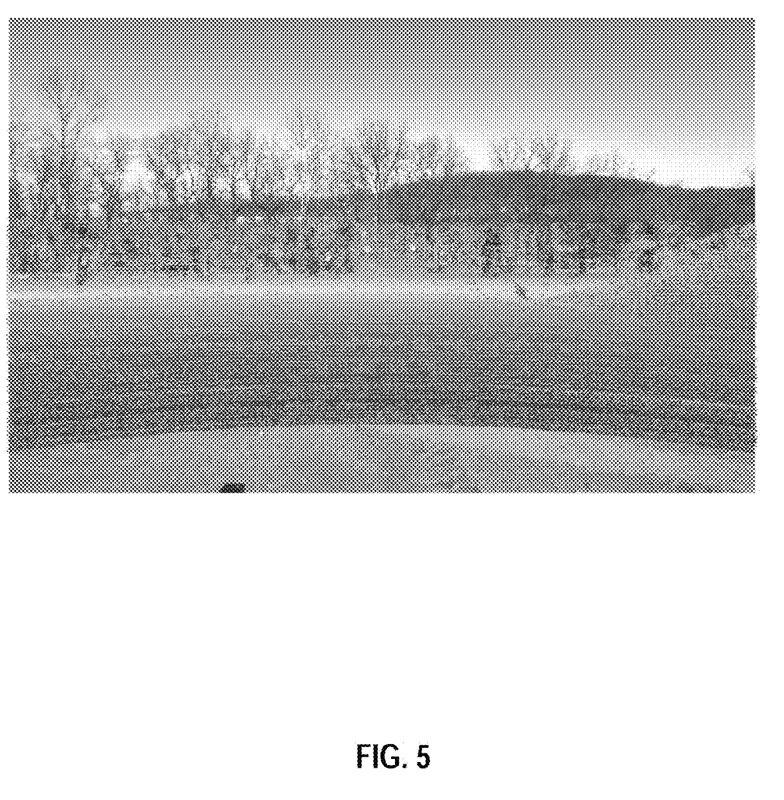

The preprocessing in step 312 may further include removing that portion of the camera image that does not overlap with the 3D point cloud from LIDAR unit 34. For example, FIG. 4 illustrates a camera image, and FIG. 5 illustrates the overlaying of the 3D point cloud on the camera image. As the range map generation may require features in the camera image to have corresponding range data, the portion of the camera image that does not have associated range data may be removed or not further considered for range map generation. Accordingly, the portion of the camera image that does not overlap with the 3D point clod from LIDAR unit 34 may either be cropped or simply not considered in the following steps. Similarly, certain portions of the 3D point cloud that extend beyond the camera 32's field of view 33 may be ignored as they may not have corresponding features in the camera images. In one embodiment, the portions of the 3D point clouds to be ignored for further processing may be determined in real time. In other embodiments, the portions of the 3D point cloud that may be ignored for further processing may be predetermined based on the calibration of camera 32 and LIDAR unit 34.

At step 314, controller 40 may transform the preprocessed 3D point cloud from LIDAR coordinates to camera coordinates. If camera 32 and LIDAR unit 34 are the same device and have the exact same view of the outside world, no transformation may be necessary. However, if camera 32 and LIDAR unit 34 are separate devices (which is normally the case), the same feature of worksite 12 may have a different x, y, z coordinate in the camera coordinate system and the LIDAR coordinate system. An exemplary transformation from LIDAR coordinates to camera coordinates may be obtained as follows:

$$P^C = R_L^C P + P_L^C \quad (1)$$

where P is 3-by-1 vector in LIDAR coordinates, $$P^C = \begin{bmatrix} X_p \\ Y_p \\ Z_p \end{bmatrix}$$

is 3-by-1 vector in the camera coordinates, $R_L^C$ and $P_L^C$ are the rotation matrix and translation vectors from LIDAR to camera coordinates.

At step 316, controller 40 may project the transformed 3D point cloud into a 2-dimensional (2D) camera image space. A 2D camera image space may correspond to a pixel resolution of camera 32's image. For example, if camera 32's resolution is 640×480 pixels, the camera image space may span 640×480 pixels. Controller 240 may utilize the intrinsic camera calibration information (e.g., focal length and center of projection) for the projection. In one embodiment, controller 240 may utilize the following exemplary equation for the transformation:

$$\begin{pmatrix} u \\ v \\ 1 \end{pmatrix} = \begin{pmatrix} f_x X_P / Z_p + o_x \\ f_y Y_P / Z_p + o_y \\ 1 \end{pmatrix} \quad (2)$$

where $(o_x, o_y)$ is the center of projection and $f_x$, $f_3$, are the focal lengths of camera 32. The projected 2D points (u, v) might be in the form of decimal and hence, controller 40 may translate the projected 2D points to the closest integer coordinate because pixel locations are integer. It will be apparent that for each projected 2D point (u,v), there is a range or distance '1' corresponding to it, which is the range '1' of the corresponding point $P^C$. Additionally, in step 316, controller 40 may reduce the number of 2D points for processing by eliminating the projected 2D points that fall outside of the image space. For example, if the image space is 640×480, and equation (2) yields u=1000, v=1000 for a given $P^C$, such a projected 2D point is outside the camera 32 image space and may be ignored or eliminated by controller 40.

At step 318, controller 40 may filter the projected 2D points based on a range threshold. As discussed earlier, each projected 2D point may have a range '1' associated with it. To improve performance and save processing power, controller 40 may specify a range threshold such that the 2D points outside of the range threshold may be eliminated or filtered out. For example, controller 40 may utilize a range threshold such as $L_{min} < 1 < L_{max}$ so that points having a range '1' outside the range threshold may be filtered out. The intuition behind the range threshold is that objects that are relatively far may not provide mapping accuracy compared to objects that are closer. On the other hand, the drawback of picking closer range points may be that those relatively closer range points could be unreliable features and might introduce biases.

At step 320, controller 40 may generate a range map by matching features in the camera image with the filtered 2D points from step 318. Controller 40 may identify features in the image obtained from camera 32 based on various predetermined discriminators that include, for example, color, brightness, or other characteristics of the image. In an example, for a given pixel or group of pixels in a first camera image, controller 40 may determine attribute values, such as color or brightness, of neighboring pixels. Controller 40 may then identify a pixel or group of pixels in a second camera image (taken either prior to or after the first camera image) with a set of neighboring pixels that match or correspond to those determined for the first camera image. Based on this identification, controller 40 may identify features in the first camera image. In various other embodiments, controller 40 may perform other methods of identifying features in images and matching features in those images.

Ideally, the projected 2D point ((u, v), which originated from the LIDAR 3D point cloud) should find an exact feature match in the 2D camera image space (uc, vc) if the camera and LIDAR image acquisition is perfectly synchronized. This is because the LIDAR unit 34 and camera 32 are capturing the same object. That is, under ideal conditions, a projected 2D point (u, v) should match with the corresponding point (uc, vc) in the camera image space. However, in reality, sensor resolution is not perfect, and measurement errors in hardware and calibration error are unavoidable. Perfect Matching between the projected 2D points (u, v) and the points in the camera image space (uc,vc) may be impossible or inefficient. In such a situation, controller 40 may use a matching window to match a feature in the camera image space with a corresponding filtered 2D point. For example, controller 40 may select a window size to find filtered 2D points (u,v) within N pixels of a given feature point (uc, vc). Such a window may be represented as |(u,v)−(uc,vc)|<N pixels. A large N may provide a bigger pool of matched 2D filtered points but with the sacrifice of matching accuracy.

If there are multiple filtered 2D points that project to the same camera image space point, the filtered 2D point with the smallest range 'l' may be used by controller 40. Such a situation could occur because multiple points from the 3D point cloud may project on to the same point in the camera image space due to, for example, rounding in step 316. By selecting the filtered 2D point with the smallest 'l,' controller 40 may be able to confusing background points from real object points. For example, the edge of a rock and a background point in a straight line to the rock edge may project to the same (u, v). But the background point would have a larger 'l' and controller 40 may choose the (u, v) corresponding to the rock edge over the background point.

Accordingly, a range map may be generated using the above steps so that a given feature in the camera image space may have a corresponding range or depth information. Fusing this information together may provide more useful information for motion estimation and for the site or machine operator.

It will be apparent to those skilled in the art that various modifications and variations can be made to the disclosed range map generation system. Other embodiments will be apparent to those skilled in the art from consideration of the specification and practice of the disclosed techniques. For example, the steps described need not be performed in the same sequence discussed or with the same degree of separation. Likewise, various steps may be omitted, repeated, or combined. It is intended that the specification and examples be considered as exemplary only, with a true scope being indicated by the following claims and their equivalents.

What is claimed is:

1. A range map generation system comprising:
   a range detection unit;
   a camera; and
   a controller configured to execute instructions to perform operations including:
     receiving an image from the camera;
     receiving a 3D point cloud from the range detection unit;
     transforming the 3D point cloud from range detection unit coordinates to camera coordinates;
     projecting the transformed 3D point cloud into a 2D camera image space corresponding to the camera resolution to yield projected 2D points;
     filtering the projected 2D points based on a range threshold; and
     generating a range map based on the filtered 2D points and the image.

2. The system of claim 1, wherein transforming the 3D point cloud from range detection unit coordinates to camera coordinates includes utilizing a rotation matrix and a translation vector to transform the 3D point cloud from range detection unit coordinates to camera coordinates.

3. The system of claim 1, wherein projecting the transformed 3D point cloud includes utilizing intrinsic calibration information of the camera to project the transformed 3D point cloud into the 2D camera image space.

4. The system of claim 3, wherein the intrinsic camera calibration includes a focal length of the camera and center of projection.

5. The system of claim 1, wherein each of the projected 2D points have a range associated therewith, and filtering the projected 2D points includes:
   setting a minimum range and a maximum range, and
   determining filtered 2D points by determining the projected 2D points whose associated range falls within the minimum and maximum range.

6. The system of claim 1, wherein generating the range map includes identifying a feature in the image and associating one of the filtered 2D points with the identified feature.

7. The system of claim 6, wherein associating one of the filtered 2D points with the identified feature includes:
   determining a pixel position of the identified feature in the 2D camera image space, and
   determining the one filtered 2D point using a matching window around the pixel position of the identified feature.

8. A computer-implemented method for range map generation, the method comprising:
   receiving an image from a camera;
   receiving a 3D point cloud from a range detection unit;
   transforming the 3D point cloud from range detection unit coordinates to camera coordinates;
   projecting the transformed 3D point cloud into a 2D camera image space corresponding to the camera resolution to yield projected 2D points;
   filtering the projected 2D points based on a range threshold; and
   generating a range map based on the filtered 2D points and the image.

9. The method of claim 8, wherein transforming the 3D point cloud from range detection unit coordinates to camera coordinates includes utilizing a rotation matrix and a translation vector to transform the 3D point cloud from range detection unit coordinates to camera coordinates.

10. The method of claim 8, wherein projecting the transformed 3D point cloud includes utilizing intrinsic calibration information of the camera to project the transformed 3D point cloud into the 2D camera image space.

11. The method of claim 10, wherein the intrinsic camera calibration includes a focal length of the camera and center of projection.

12. The method of claim 8, wherein each of the projected 2D points have a range associated therewith, and filtering the projected 2D points includes:
setting a minimum range and a maximum range, and
determining filtered 2D points by determining the projected 2D points whose associated range falls within the minimum and maximum range.

13. The method of claim 8, wherein generating the range map includes identifying a feature in the image and associating one of the filtered 2D points with the identified feature.

14. The method of claim 13, wherein associating one of the filtered 2D points with the identified feature includes:
determining a pixel position of the identified feature in the 2D camera image space, and
determining the one filtered 2D point using a matching window around the pixel position of the identified feature.

15. A non-transitory computer-readable storage medium storing instructions that enable a computer to implement a method for range map generation, the method comprising:
receiving an image from a camera;
receiving a 3D point cloud from a range detection unit;
transforming the 3D point cloud from range detection unit coordinates to camera coordinates;
projecting the transformed 3D point cloud into a 2D camera image space corresponding to the camera resolution to yield projected 2D points;
filtering the projected 2D points based on a range threshold; and
generating a range map based on the filtered 2D points and the image.

16. The non-transitory computer-readable storage medium of claim 15, wherein transforming the 3D point cloud from range detection unit coordinates to camera coordinates includes utilizing a rotation matrix and a translation vector to transform the 3D point cloud from range detection unit coordinates to camera coordinates.

17. The non-transitory computer-readable storage medium of claim 15, wherein projecting the transformed 3D point cloud includes utilizing intrinsic calibration information of the camera to project the transformed 3D point cloud into the 2D camera image space.

18. The non-transitory computer-readable storage medium of claim 17, wherein the intrinsic camera calibration includes a focal length of the camera and center of projection.

19. The non-transitory computer-readable storage medium of claim 15, wherein each of the projected 2D points have a range associated therewith, and filtering the projected 2D points includes:
setting a minimum range and a maximum range, and
determining filtered 2D points by determining the projected 2D points whose associated range falls within the minimum and maximum range.

20. The non-transitory computer-readable storage medium of claim 15, wherein generating the range map includes identifying a feature in the image and associating one of the filtered 2D points with the identified feature.

* * * * *